US005512969A

United States Patent [19]
Harris

[11] Patent Number: 5,512,969
[45] Date of Patent: Apr. 30, 1996

[54] WATER-RESISTANT CAMERA HOUSING

[75] Inventor: Clark E. Harris, Fairport, N.Y.

[73] Assignee: Eastman Kodak Company, Rochester, N.Y.

[21] Appl. No.: 388,072

[22] Filed: Feb. 14, 1995

[51] Int. Cl.⁶ .................................................. G03B 17/08
[52] U.S. Cl. ...................................... 354/64; 354/288
[58] Field of Search .................... 354/64, 288; 348/81; 206/316.2; D16/204

[56] References Cited

U.S. PATENT DOCUMENTS

| D. 321,704 | 11/1991 | Leonard et al. | D16/204 X |
| 4,803,504 | 2/1989 | Maeno et al. | 354/64 |
| 5,126,772 | 6/1992 | Albrecht | 354/64 |
| 5,285,894 | 2/1994 | Kamata et al. | 354/64 X |
| 5,325,139 | 6/1994 | Matsumoto | 354/64 |

FOREIGN PATENT DOCUMENTS

| 3-54923 | 5/1991 | Japan . |
| 3-63130 | 6/1991 | Japan . |

Primary Examiner—A. A. Mathews
Attorney, Agent, or Firm—Roger A. Fields

[57] ABSTRACT

A water-resistant camera housing comprises a pair of housing sections, and a waterproof sealing band covering a seam between the housing sections to provide a water-resistant seal for the seam. The pair of housing sections are joined at an integral flexible hinge in line with the seam to constitute a single-piece housing. The sealing band has a pair of opposite end portions that are located adjacent one another over the flexible hinge.

2 Claims, 4 Drawing Sheets 5,512,969

WATER-RESISTANT CAMERA HOUSING

CROSS-REFERENCE TO RELATED APPLICATION

Reference is made to commonly assigned copending application Ser. No. 08/388,073 entitled SEALING BAND FOR WATER-RESISTANT CAMERA HOUSING, and filed Feb. 14, 1995 in the names of Dwight J. Petruchik and Kevin J. O'Leary

FIELD OF THE INVENTION

The invention relates generally to the field of photography, and in particular to a water-resistant camera housing.

BACKGROUND OF THE INVENTION

The most widely used water-resistant camera housing for underwater photography essentially is a rigid transparent box.

As disclosed in prior art Japanese patent application No. 3-54923, published May 28, 1991, the transparent box may comprise a pair of separable box halves joined at a continuous seam which is in the shape of a rectangle. A continuous elastic band is arranged taut over the seam to provide a water-resistant seal along the seam.

A less costly sealing band is one which is non-continuous, that is it has a pair of opposite end portions. The sealing band might be secured to the box halves along the seam, and the end portions would be abutted end-to-end over the seam.

The Cross-referenced Application

The cross-referenced application discloses a water-resistant camera housing comprising a pair of separable housing sections, and a waterproof sealing band covering a separation seam between the housing sections to provide a water-resistant seal for the seam. The sealing band has a pair of opposite end portions one of which overlaps the other but leaves a slight gap between them adjacent the seam. A waterproof filler occupies the gap to provide a water-resistant seal in the gap for the seam.

This is believed to provide a more effective seal as compared to the prior art example in which the opposite end portions of the sealing band are abutted end-to-end over the seam.

SUMMARY OF THE INVENTION

A water-resistant camera housing comprising a pair of housing sections, and a waterproof sealing band covering a seam between the housing sections to provide a water-resistant seal for the seam, is characterized in that:

the pair of housing sections are joined at an integral flexible hinge in line with the seam to constitute a single-piece housing; and the sealing band has a pair of opposite end portions that are located adjacent one another over the flexible hinge.

More specifically, one of the opposite end portions of the sealing band overlaps the other to leave a slight gap between the opposite end portions adjacent the flexible hinge.

This is believed to provide a more effective seal as compared to the prior art example in which the opposite end portions of the sealing band are abutted end-to-end over the seam.

DETAILED DESCRIPTION OF THE INVENTION

The invention is disclosed as being embodied in a water-resistant housing for enclosing a camera. Because the features of a water-resistant housing for enclosing a camera are generally known, as exemplified by prior art U.S. Pat. No. 321,704, issued Nov. 19, 1991, and U.S. Pat. No. 5,126,772, issued Jun. 30, 1992, the description which follows is directed in particular only to those elements forming part of or cooperating directly with the disclosed embodiment. It is to be understood, however, that other elements may take various forms known to a person of ordinary skill in the art.

Figure 1:
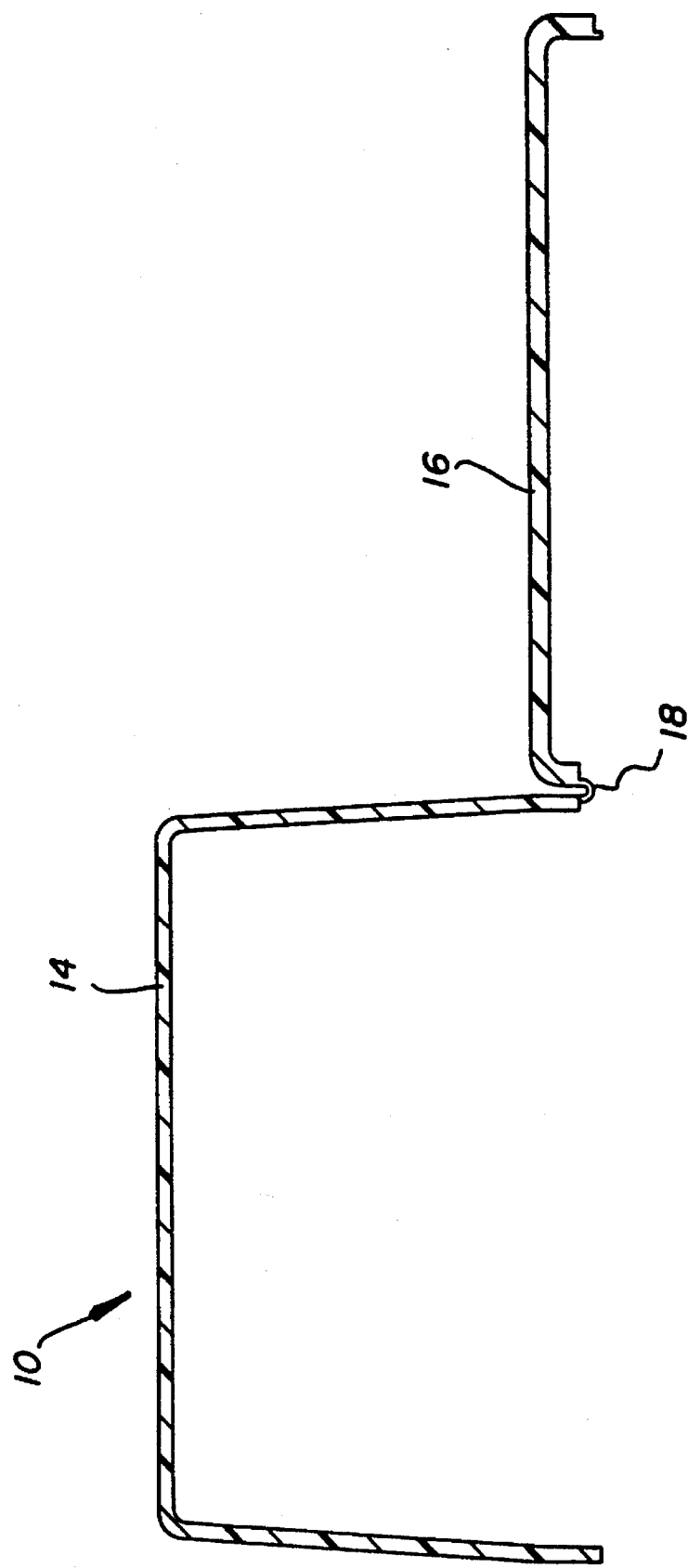
FIG. 1 is a cross-section elevation view of a water-resistant housing for a camera according to a preferred embodiment of the invention, showing the housing opened.
Figure 2:
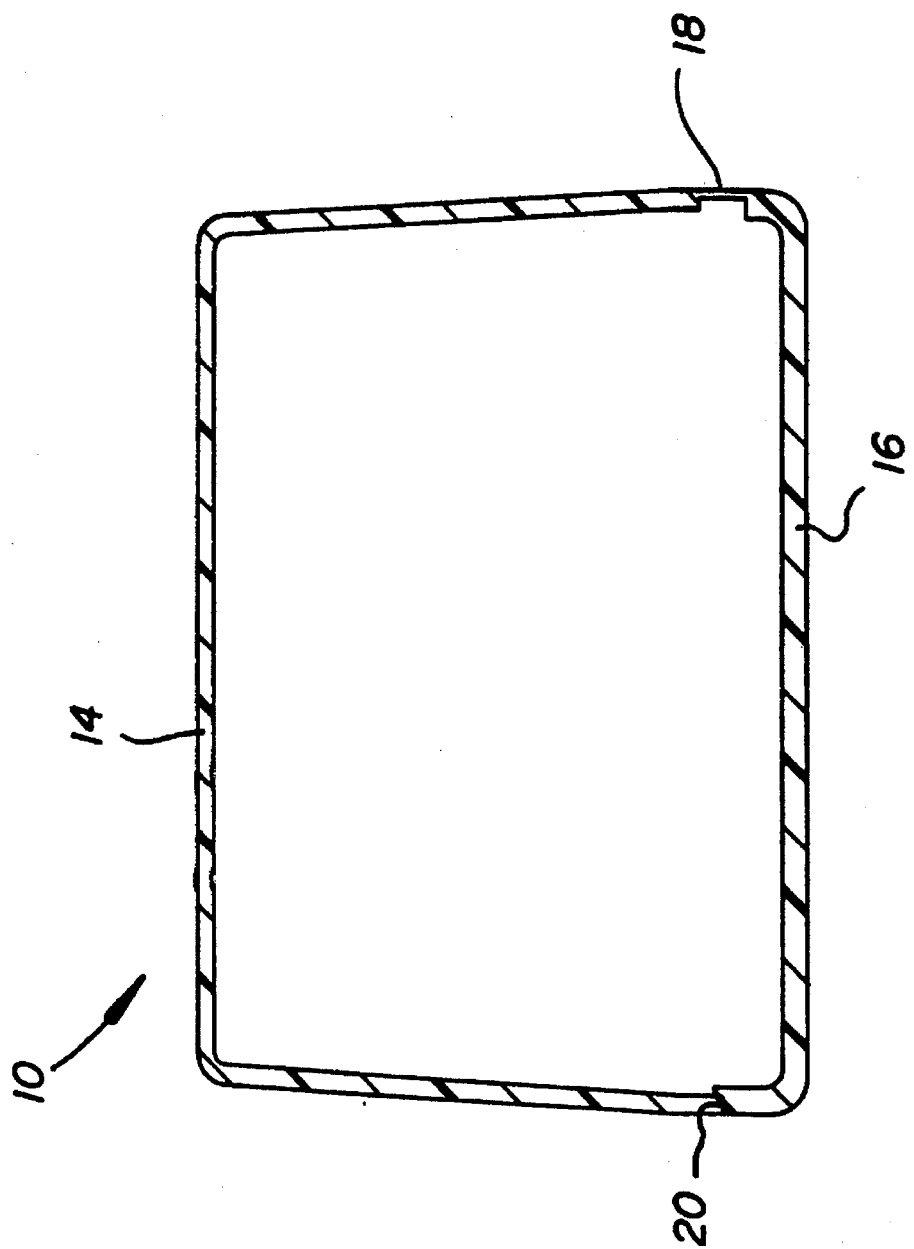
FIG. 2 is a cross-section elevation view similar to FIG. 1, showing the water-resistant housing closed.
Figure 3:
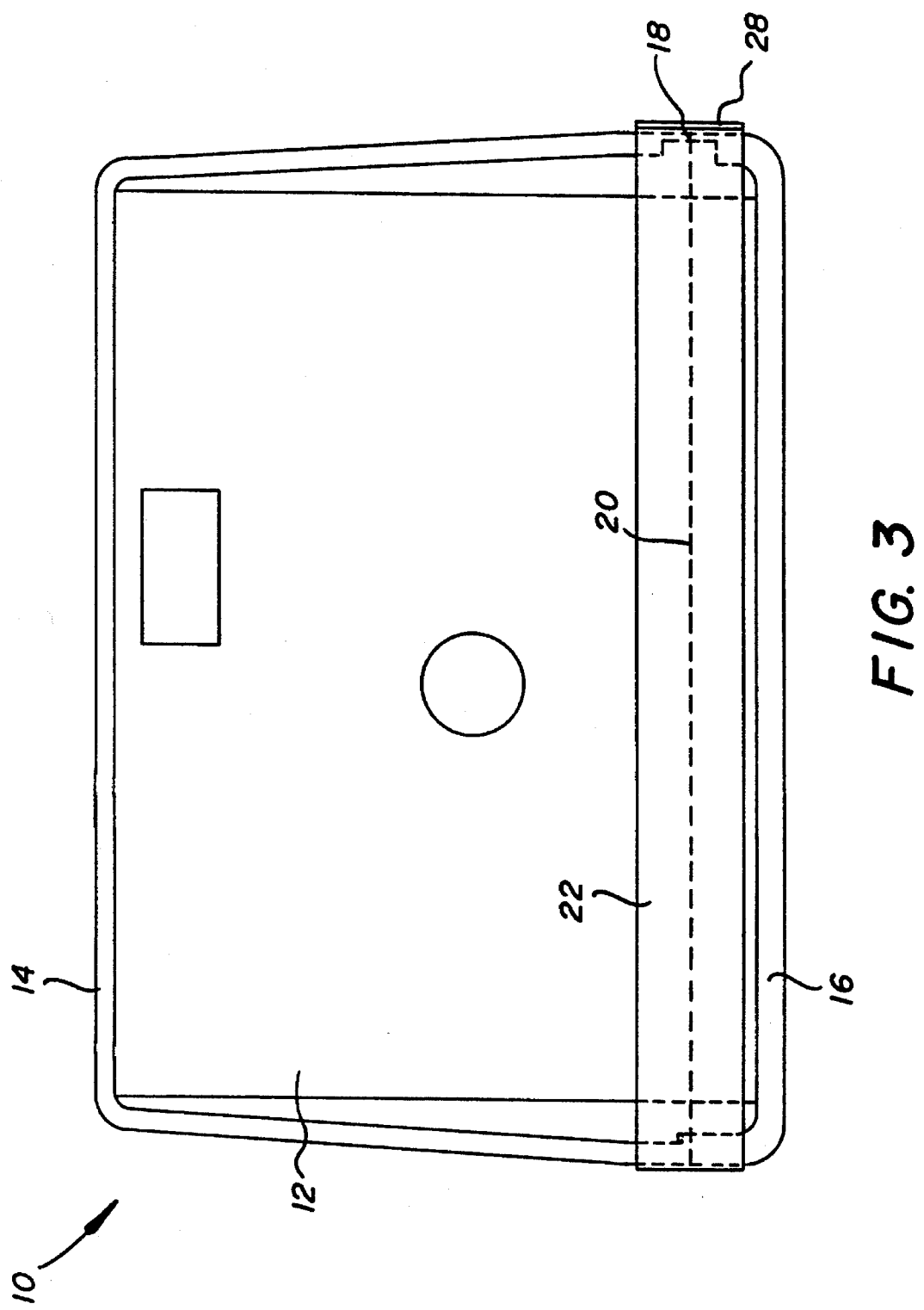
FIG. 3 is a front elevation view of the water-resistant housing enclosing the camera and a waterproof sealing band covering a seam in the housing.

Referring now to the drawings, FIGS. 1–3 show a rigid transparent water-resistant housing 10 for enclosing a camera 12 such as the single-use camera disclosed in U.S. Pat. No. 5,126,772. The housing 10 has a seamless or unitary larger-volume top half 14 and a seamless or unitary smaller-volume bottom half 16 which are joined at an integral flexible or "living" hinge 18 to constitute a single-piece housing. The flexible hinge 18, as shown in FIG. 3, is in line with (disrupts) a seam 20 between the top and bottom halves 14 and 16. The top half 14 is intended to fold over the camera 12 and couple with the bottom half 16. The camera 12 is seated in the bottom half 16.

Figure 4:
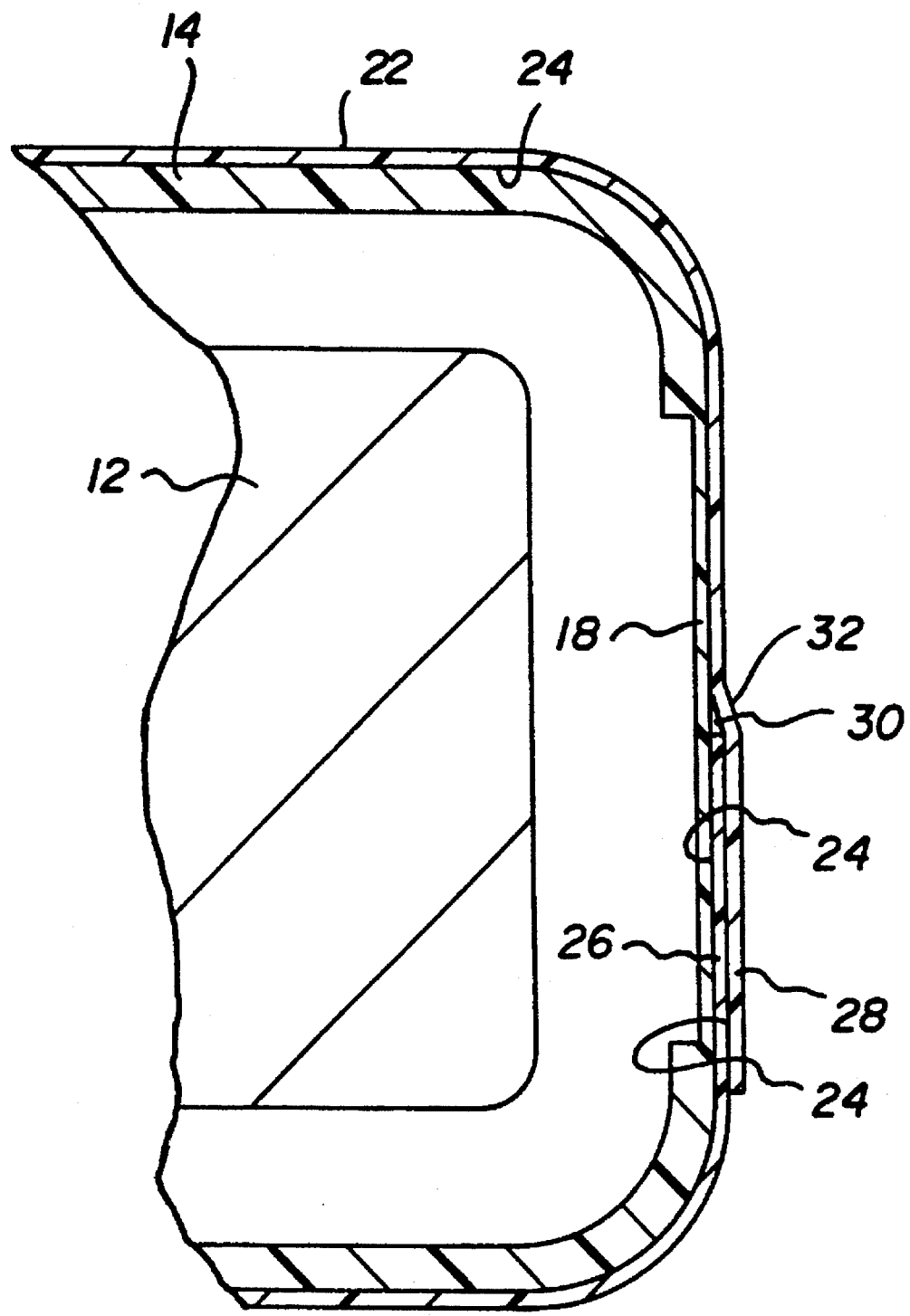
FIG. 4 is a cross-section plan view of a portion of the water-resistant housing, the camera, and the sealing band depicted in FIG. 4.

A waterproof sealing band 22 with an adhesive back 24 is pressure or heat adhered, by means of the adhesive back, to the top and bottom halves 14 and 16 as shown in FIGS. 3 and 4. The sealing band 18 is adhered to the top and bottom halves 14 and 16 completely along the seam 20 and the flexible hinge 18, to provide a water-resistant seal for the seam.

The sealing band 22 has a pair of opposite end portions 26 and 28, shown in FIGS. 3 and 4. The end portion 26 is adhered to the top and bottom halves 14 and 16 along the flexible hinge 18. Conversely, the end portion 28 overlaps and is adhered to the end portion 26 to conceal the latter end portion as shown in FIG. 4. However, there results a slight gap or open space 30 between the two end portions 26 and 28 adjacent the flexible hinge 18. The gap 30 is located beneath a small section 32 of the end portion 28 which is inclined away from the flexible hinge 18 to accommodate the thickness of the end portion 26.

The invention has been described with reference to a preferred embodiment. However, it will be appreciated that variations and modifications can be effected by a person of ordinary skill in the art without departing from the scope of the invention.

PARTS LIST 10. water-resistant housing
12. camera
14. top housing half 16. bottom housing half
18. flexible hinge
20. seam
22. waterproof sealing band
24. adhesive back
26. band end portion
28. band end portion
30. gap
32. band section

I claim:

1. A water-resistant camera housing comprising a pair of housing sections, and a waterproof sealing band covering a seam between said housing sections to provide a water-resistant seal for said seam, is characterized in that:

said pair of housing sections are joined at an integral flexible hinge in line with said seam to constitute a single-piece housing; and said sealing band has a pair of opposite end portions that are located adjacent one another over said flexible hinge.

2. A water-resistant camera housing as recited in claim 1, wherein one of said opposite end portions of the sealing band overlaps the other to leave a slight gap between the opposite end portions adjacent said flexible hinge.

* * * * *